US012688231B2

(12) United States Patent
Seilbeck et al.

(10) Patent No.: US 12,688,231 B2
(45) Date of Patent: ***Jul. 21, 2026

(54) METHOD FOR FILTERING A GRAPH

(71) Applicant: Celonis SE, Munich (DE)

(72) Inventors: Robert Seilbeck, Putzbrunn (DE); Willi Mann, Grünwald (DE); Martin Klenk, Munich (DE)

(73) Assignee: CELONIS SE, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/839,385

(22) PCT Filed: Feb. 16, 2023

(86) PCT No.: PCT/EP2023/053925

§ 371 (c)(1),
(2) Date: Aug. 16, 2024

(87) PCT Pub. No.: WO2023/161128

PCT Pub. Date: Aug. 31, 2023

(65) Prior Publication Data

US 2025/0156477 A1 May 15, 2025

(30) Foreign Application Priority Data

Feb. 23, 2022 (EP) ..................................... 22158277

(51) Int. Cl.
*G06F 16/23* (2019.01)
*G06F 16/22* (2019.01)
*G06F 16/27* (2019.01)
*G06F 16/901* (2019.01)

(52) U.S. Cl.
CPC ................................. *G06F 16/9024* (2019.01)

(58) Field of Classification Search
CPC . G06F 16/9024; G06F 16/28; G06F 16/90335
See application file for complete search history.

(56) References Cited

U.S. PATENT DOCUMENTS

| | | | | |
|---|---|---|---|---|
| 9,614,854 B2 * | 4/2017 | Obbard | ............... | G06F 21/6209 |
| 10,318,583 B2 * | 6/2019 | Feinberg | ............. | G06F 16/9024 |
| 11,204,789 B2 * | 12/2021 | Hinton | ................ | G06F 16/9024 |
| 11,218,574 B2 * | 1/2022 | Thantry | .............. | G06F 16/9024 |

(Continued)

FOREIGN PATENT DOCUMENTS

| | | |
|---|---|---|
| EP | 3223169 A1 | 9/2017 |
| JP | 2010-020771 A2 | 1/2010 |
| JP | 2011-164830 A2 | 8/2011 |

*Primary Examiner* — Debbie M Le
(74) *Attorney, Agent, or Firm* — Thomas | Horstemeyer, LLP

(57) ABSTRACT

Provided is a computer-implemented method to extract a subgraph from a graph which is stored with a storage device without prior knowledge of the structure of the graph. The graph represents a network. The subgraph starts from at least one selected node into a selected direction. Each directed edge of the graph is composed of an outgoing edge which is connected to a start node and an incoming edge which is connected to an end node. The subgraph is extracted according to a traversal of the graph starting from the at least one selected node into the selected direction according to a predefined graph traversal protocol.

16 Claims, 10 Drawing Sheets

(56)                   References Cited

U.S. PATENT DOCUMENTS

| 12,038,742 | B2 * | 7/2024 | Koziolek ......... G05B 19/41865 |
| 2010/0010952 | A1 | 1/2010 | Kuhn et al. |
| 2013/0103725 | A1 | 4/2013 | Wee et al. |
| 2015/0120432 | A1 * | 4/2015 | Wang ................ G06Q 30/0242 |
| | | | 705/14.41 |
| 2016/0342709 | A1 | 11/2016 | Fokoue-Nkoutche et al. |

* cited by examiner

| FIG. 1 - Legend | |
|---|---|
| 1 | Graph Representing a Process Network |
| 10 | Start Node |
| 15 | Outgoing Directed Edge |
| 20 | End Node |
| 25 | Incoming Directed Edge |
| 30 | Unique Relationship Identifier |

| FIG. 2 - Legend | |
|---|---|
| 1 | Graph Representing a Process Network |
| 10 | Start Node |
| 15 | Outgoing Directed Edge |
| 20 | End Node |
| 25 | Incoming Directed Edge |
| 30 | Unique Relationship Identifier |

| FIG. 3 - Legend | |
|---|---|
| 1 | Graph Representing a Process Network |
| 10 | Start Node |
| 15 | Outgoing Directed Edge |
| 20 | End Node |
| 25 | Incoming Directed Edge |

| FIG. 4 - Legend | |
|---|---|
| 1 | Graph Representing a Process Network |
| 10 | Start Node |
| 15 | Outgoing Directed Edge |
| 20 | End Node |
| 25 | Incoming Directed Edge |
| 30 | Unique Relationship Identifier |

| FIG. 5 - Legend | |
|---|---|
| 1 | Graph Representing a Process Network |
| 10 | Start Node |
| 15 | Outgoing Directed Edge |
| 20 | End Node |
| 25 | Incoming Directed Edge |

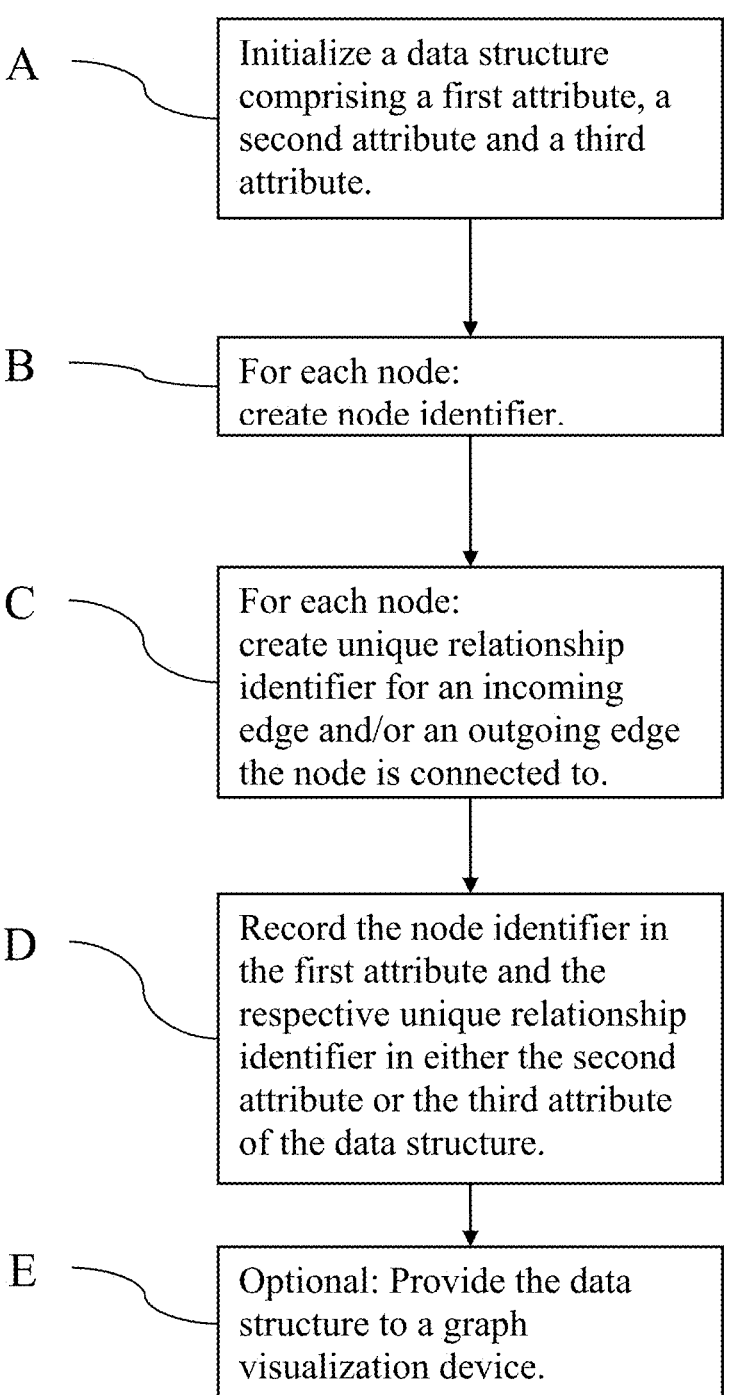

A — Initialize a data structure comprising a first attribute, a second attribute and a third attribute.

B — For each node:
create node identifier.

C — For each node:
create unique relationship identifier for an incoming edge and/or an outgoing edge the node is connected to.

D — Record the node identifier in the first attribute and the respective unique relationship identifier in either the second attribute or the third attribute of the data structure.

E — Optional: Provide the data structure to a graph visualization device.

Fig. 6

| FIG. 7 - Legend | |
|---|---|
| 1 | Graph Representing a Process Network |
| 10 | Start Node |
| 15 | Outgoing Directed Edge |
| 20 | End Node |
| 25 | Incoming Directed Edge |

| FIG. 8 - Legend | |
| --- | --- |
| 1 | Graph Representing a Process Network |
| 10 | Start Node |
| 15 | Outgoing Directed Edge |
| 20 | End Node |
| 25 | Incoming Directed Edge |
| 30 | Unique Relationship Identifier |
| 40 | User Defined Initial Node |

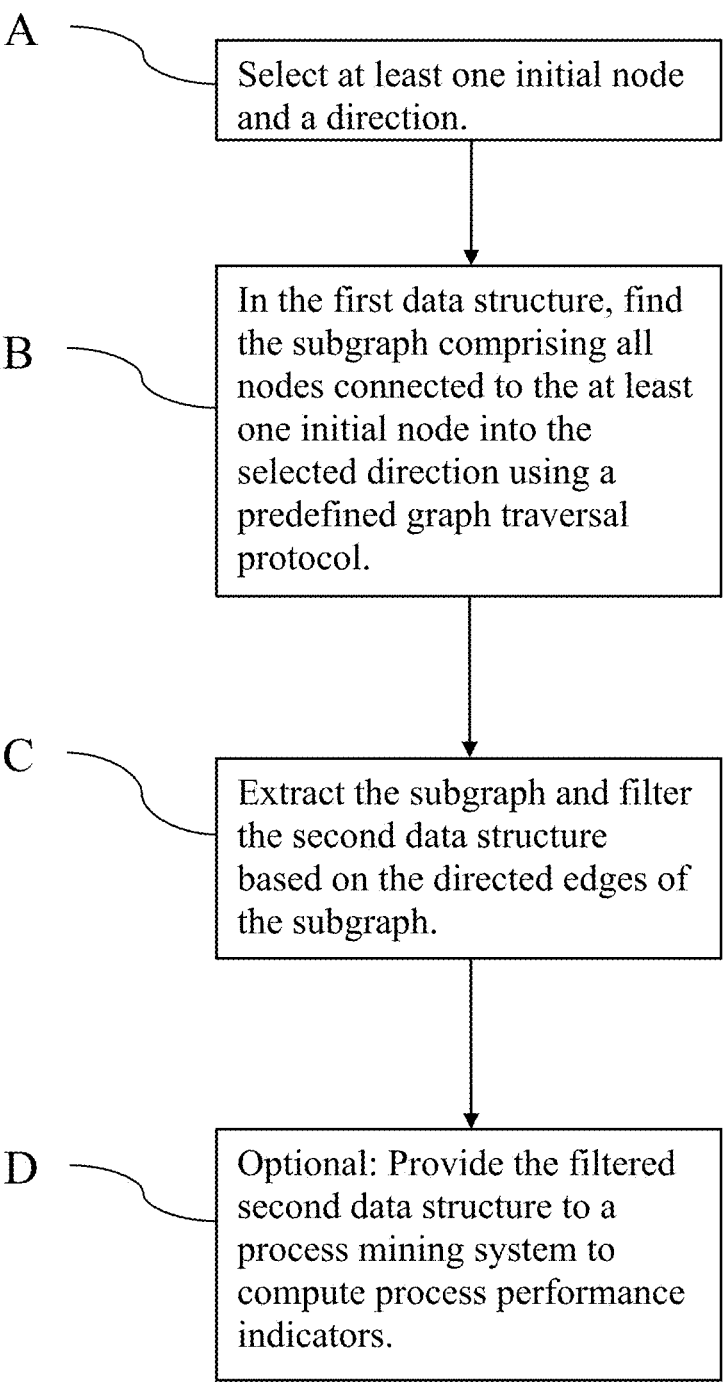

A — Select at least one initial node and a direction.

B — In the first data structure, find the subgraph comprising all nodes connected to the at least one initial node into the selected direction using a predefined graph traversal protocol.

C — Extract the subgraph and filter the second data structure based on the directed edges of the subgraph.

D — Optional: Provide the filtered second data structure to a process mining system to compute process performance indicators.

Fig. 9

METHOD FOR FILTERING A GRAPH

CROSS-REFERENCE TO RELATED APPLICATIONS

This application is a national phase entry of International Patent Application No. PCT/EP2023/053925, filed Feb. 16, 2023, which claims the benefit of EP 22158277.8, filed Feb. 23, 2022, the entire disclosures of which are hereby incorporated herein by reference in their entirety.

FIELD OF THE INVENTION

The invention relates to a method to filter a graph stored in a storage device.

BACKGROUND OF THE INVENTION

Networks, in particular directed networks, encode the flow of a system parameter along multiple entities. One example for a network is a supply chain network, wherein the system parameter may be a material or a planned distribution or a combination thereof. Another example for the network is a process network, wherein the system parameter may be an output of a process step, such as a material or a business document or any combination thereof.

In a supply chain network, it is crucial to understand how materials and/or goods are flowing and/or how material is planned to be distributed. Material flows and/or planned distributions in supply chain networks fuel various use cases, for instance, estimating which finished goods might be affected due to a raw material shortage or calculating the carbon foot print of a product based on its components, their respective components and so on. These networks can comprise an arbitrary number of plant and material combinations, which are denoted stock keeping units (SKUs) in the following.

In a typical scenario of a supply chain network, several SKUs are involved in multiple layers representing different stages in a production phase as well as in the distribution of goods. In practice, both the production and the distribution are often scattered over multiple manufacturers. The layers of SKUs can range from raw materials over partially produced goods to the finished good itself. Due to the various layers between raw materials and the finished good there are usually many SKUs involved which span the supply chain network.

Likewise, single processes, such as business processes (e.g., an order process) or technical manufacturing processes (e.g., processes executed in the SKUs of a supply chain network) are in practice often part of a (large) process network. Hereby, processes are executed in a computer system or with the aid of a computer system and may comprise several process steps. The execution of a process is called a process instance. Each process step may create data during the execution, which is stored in the computer system, in which the process is carried out or with the aid of which the process is carried out.

It is known to store process instances along with their process steps in a process protocol, from which single process instances may be analyzed efficiently using classical process mining techniques. However, in a realistic scenario, instances of different processes can be hardly considered isolated from each other. Instances of different processes are rather connected in a process network. In a process network, however, classical process mining fails to analyze the interactions between process instances of two or more different processes. In practice, process networks are wide spread as most organizations run not just a set of independent sequential processes but rather comprise many processes which are interacting with each other and with processes of other organizations.

Technically, a network, such as the supply chain network or the process network, may be represented using a graph. A graph usually consists of nodes and edges, wherein the nodes may represent entities of the respective network and the edges interactions between entities in the respective network.

In practice, the nodes (entities) are usually stored in a disconnected manner. For instance, in a supply chain network, the SKUs are usually organized in different (relational) data tables. In process networks, single processes are stored independently of each other in a process protocol.

In practice, the landscapes of interconnected SKUs and/or interconnected processes in modern networks change constantly. Therefore, traditional approaches that would either manually connect one SKU to another, (e.g. via joining tables in a relational database), or manually connect one process instance to another, are highly inefficient and prone to errors. Thus, usual approaches for storing a graph representing a modern network, in particular a supply chain network and/or a process network, may directly lead to incorrect reconstructions and subsequent analysis of such a network.

Due to the large amount of data involved in such a network, the traditional approaches for storing a graph representing the network furthermore often leads to timeouts since a manual connection of nodes in the graph, representing entities in the network, are computationally very demanding.

OBJECT OF THE INVENTION

Therefore, it is an object of the present invention to provide a method for filtering on a graph representing a network, in order to efficiently extract nodes that are interconnected to a selected node.

Solution According to the Invention

Accordingly, a computer-implemented method for extracting a subgraph of a graph, the subgraph starting from at least one selected node into a selected direction, is provided. The graph represents a network and comprises multiple nodes and multiple directed edges. Each directed edge connects a start node and an end node wherein each directed edge is composed of an incoming edge which is connected to the end node and an outgoing edge which is connected to the start node. Each node represents an entity of the network. Each directed edge represents a relationship between two entities.

The method comprises:

Recording each start node in a first record of a first data structure stored with a storage device, and each end node in a second record of the first data structure.

Each record comprises at least:

a combination of a number of first attributes, in which an identifier of a node is stored, a combination of a number of second attributes, in which an identifier of an incoming edge is stored, a combination of a number of third attributes, in which an identifier of an outgoing edge is stored.

The method further comprises storing, in the first record, the identifier of the start node in the combination of the number of first attributes and a unique relationship identifier in the combination of the number of third attributes. The unique relationship identifier represents a step along a path in the network. In other words, the unique relationship identifier represents an interaction between two entities of the network.

The method further comprises storing, in the second record, the identifier of the end node in the combination of the number of first attributes and the unique relationship identifier in the combination of the number of second attributes.

A value of the combination of the number of second attributes of the second record matching the value of the combination of the number of third attributes of the first record defines the directed edge between the start node and the end node. The subgraph is extracted according to a traversal of the graph starting from the at least one selected node into the selected direction according to a predefined graph traversal protocol.

The method according to the invention has the advantage that a graph representing a network can be filtered without an à-priori knowledge of which nodes are adjacent to which node, i.e., of the neighborhood of nodes. The first data structure can be recorded with nodes from different individual raw data sources according to a predefined rule for creating the unique relationship identifier assigned to the incoming edge or outgoing edge the nodes are connected to. At the time of recording the first data structure the directed edges of the graph are not yet defined. The directed edges and with those the graph as such only emerge from the recorded first data structure, namely from finding identical unique relationship identifiers assigned to the second attribute of the second record and the third attribute of the first record. Based thereon, the emerged graph can be filtered using any graph traversal protocol. Furthermore, subgraphs can be determined in real time, independent of the number of nodes.

Traditionally, a graph is first determined, i.e., its structure is to be known and fixed accordingly, before the graph can be stored in a storage device and filtered subsequently. According to the invention, in contrast, only the data which describes the entities in the network is recorded in the first data structure, without knowledge of the relationships within the network. A further technical advantage is that predecessor-successor relationships of nodes (i.e. between the nodes) do not need to be explicitly stored, which significantly reduce the amount of data. The graph representing the network eventually results from the first data structure.

Filtering the graph by extracting subgraphs of any size from the graph which emerges from the first data structure enables the efficient analysis of network effects even in very large networks with thousands (and more) of interconnected entities, since the number of interactions (direct edges between two entities) can be strongly reduced.

Further, the filter may be used for analyzing the graph representing the network by means of a windowing technique, such as a sliding window, a tumbling window, etc. In doing so, average network performance measures can be determined and compared along different regions the network.

The graph to be filtered can be adapted in a very flexible way by creating, updating or deleting records of the first data structure. Similarly, insights on the graph can be updated flexibly by using the method according to the invention to filter constantly adapted graphs due to (rapidly) changing raw data.

The predefined graph traversal protocol is one of a group of algorithms, the group consisting of:
- a breadth-first search for records comprising nodes which form directed edges with the at least one selected node along the selected direction,
- a depth-first search for records comprising nodes which form directed edges with the at least one selected node along the selected direction, or
- a combination thereof.

The breadth-first search comprises the following steps:
- a) identifying the at least one record of the at least one selected node based on the selected direction and marking one record of the at least one selected record as a current member of the subgraph,
- b) matching the value of the combination of the number of second attributes of the second record with the value of the combination of the number of third attributes of the first record to find at least one record comprising the node which forms the directed edge along the selected direction with the current member of the subgraph and marking the at least one found record as member of the subgraph,
- c) repeating step b) for every record found in step b), wherein with repeating step b) each found record is marked as current record, until no further record is found and marking all found records as member of the subgraph,
- d) repeating steps b) and c) for every record of the at least one selected records, and
- e) extracting the records marked as member of the subgraph from the first data structure to store the subgraph with the storage device.

The depth-first search comprises the following steps:
- a) identifying the at least one record of the at least one selected node based on the selected direction and marking one record of the at least one selected record as a current member of the subgraph,
- b) matching the value of the combination of the number of second attributes of the second record with the value of the combination of the number of third attributes of the first record to find at least one record comprising the node which forms the directed edge along the selected direction with the current member of the subgraph and marking the at least one found record as member of the subgraph,
- c) repeating step b) for one record found in step b), wherein with repeating step b) the one found record is marked as current record, until no further record is found and marking all found records as member of the subgraph,
- d) repeating steps b) and c) for every record found in step b),
- e) repeating steps b), c) and d) for every record of the at least one selected records, and
- f) extracting the records marked as member of the subgraph from the first data structure to store the subgraph with the storage device.

The selected direction is one of a network upstream direction and a network downstream direction, wherein the at least one record of the at least one selected node, in which the unique relationship identifier is assigned to the combination of the number of second attributes, is identified for the network upstream direction, and the at least one record of the at least one selected node, in which the unique relationship identifier is assigned to the combination of the number of third attributes, is identified for the network downstream direction.

In one embodiment, the network is a process network, wherein the process network comprises two or more process instances of different processes and interactions between process steps of process instances of at least two different processes. Each node represents a process step of a process instance. The unique relation-ship identifier represents a signal between the start node which forms part of a process instance of a first process and the end node which forms part of a process instance of a second process, in particular an output of the start node provided to the end node. The data structure further comprises a fourth attribute, in which a sequence of the process steps within a process instance is stored, such that the data structure forms an extended process protocol.

Preferably, the fourth attribute stores an ordinal value related to the respective process step. A record of the at least one found record is only marked as a member of the subgraph if the ordinal value assigned to the fourth attribute of the record is larger than the ordinal value of the current member of the subgraph.

The ordinal value can be a timestamp, for instance.

In one embodiment, at least one node is both the end node connected to at least one incoming edge and the start node connected to at least one outgoing edge, and wherein the method further comprises recording each node of the at least one node in at least one record, wherein, in each record of the at least one record, the identifier of each node is assigned to the combination of the number of first attributes, a first unique relationship identifier of one incoming edge is assigned to the combination of the number of second attributes, and a second unique relationship identifier of one outgoing edge is assigned to the combination of the number of third attributes.

In one embodiment, the number of first attributes in the combination of the number of first attributes is one and/or the number of second attributes in the combination of the number of second attributes is one and/or the number of third attributes in the combination of the number of third attributes is one.

In one embodiment, the form directed edge is recorded in a record of a second data structure stored in the storage device. The second data structure comprises at least:

a first attribute, in which an identifier of the start node connected to the formed directed edge is stored, a second attribute, in which an identifier of the end node connected to the formed directed edge is stored, and a third attribute, in which the unique relationship identifier of the formed directed edge is stored.

Preferably, each record of the first data structure comprises a number of further attributes, in which data characterizing the respective incoming edge and/or outgoing edge is stored, and wherein at least one value of the number of further attributes is retrieved and assigned to the formed directed edge, wherein the at least one retrieved value is stored in a number of further attributes of the second data structure.

Based on the further attributes, additional indicators on the directed edges, in particular (process) performance indicators, can be accessed.

In one embodiment, the method further comprises a filtering of the records of the second data structure by the at least one directed edge form between adjacent members of the subgraph.

In one embodiment, the nodes of the extracted subgraph are aggregated based on a subordinate hierarchy level, wherein the formed directed edges are aggregated accordingly yielding an aggregated subgraph, wherein the records of the second data structure are filtered based on the aggregated subgraph.

Preferably, the filtered records of the second data structure are provided to a process mining system for calculating at least one process performance measure.

Preferably, the storage device is a volatile memory, in particular the main memory, of a computer system.

BRIEF DESCRIPTION OF THE FIGURES

Details and features of the invention as well as concrete embodiments of the invention can be derived from the following description in connection with the drawing, in which:

FIG. 6 shows a flow chart of the method to store a graph representing a network according to an embodiment of the invention;

FIG. 9 shows a flow chart for an embodiment of the method for filtering on the graph stored in the first data structure.

DETAILED DESCRIPTION OF THE INVENTION

Networks are used across industries to organize and communicate information efficiently. In order to analyze the information comprised in a network, a technical representation of the network is required, such that the network can be stored in a storage device and evaluated, e.g. by performing calculations on the network, often repeatedly.

Usually, a graph serves as a technical representation of a network. Each edge of the graph connects, or links, a start node and an end node. The node is a technical representation of an entity of the network and the edge is a technical representation of a relationship between two entities in the network.

On a technical level, a directed network can be represented by a directed graph. The directed graph comprises multiple nodes and multiple directed edges, wherein a directed edge points to one of the two nodes it is connecting.

A directed edge between the start node and the end node can represent a relationship between the start node and the end node, wherein the relationship is characterized by a direction, such as a signal which is issued from the start node and received by the end node. Hence, multiple linked directed edges of a (directed) graph may represent a path of a signal across the network, wherein the signal links one entity of the network to another.

Figure 1:
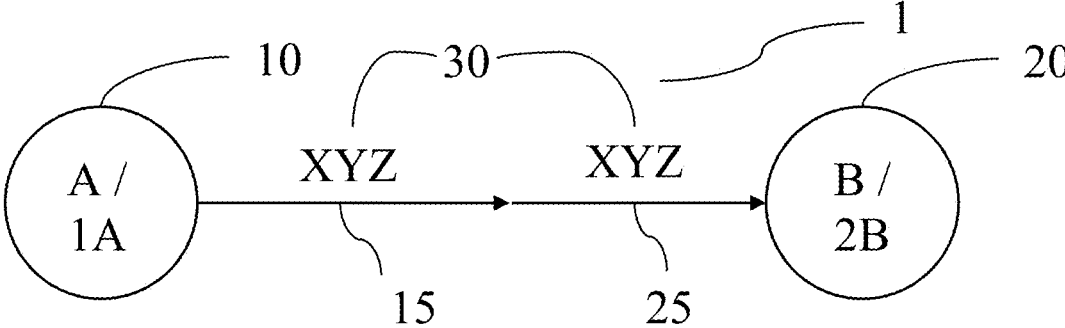
FIG. 1 shows a visualization of a directed edge of a graph representing a network, wherein the graph is stored according to an embodiment of the invention.

FIG. 1 shows a visualization of a directed edge of a graph representing a network, wherein the graph is stored according to an embodiment of the invention.

The directed edge 15; 25 shown in FIG. 1 connects a start node 10 to an end node 20, wherein the edge 15; 25 is directed to point from the start node 10 to the end node 20. In a graph 1 representing a supply chain network, for example, the start node 10 can represent a combination of a raw material/component and a plant, and the end node 20 represent a combination of an intermediate component/product and a plant. In a graph 1 representing a process network, for example, the start node 10 can represent a process step of a first process instance and the end node 20 can represent a process step of a second process instance.

The directed edge 15; 25 is composed of an outgoing edge 15 which is connected to the start node 10 and an incoming edge 15 which is connected to the end node 20. Both to the outgoing edge 15 and the incoming edge 25 a unique relationship identifier 30 is assigned, respectively. If the unique relationship identifier of the outgoing edge 15 matches exactly the unique relationship identifier of the incoming edge 25, as it is the case in FIG. 1, then the directed edge 15; 25 is formed. Thus, the unique relationship identifier serves as a connection means by which a pair of start node 10 and end node 20 is formed.

The unique relationship identifier 30 comprises data characterizing the relationship between two entities, in particular a signal linking the two entities of the network. In a supply chain network, for example, the unique relationship identifier 30 can comprise a bill-of-material (BOM) identifier and alternative bill-of-material (Alt BOM) identifier and a plant identifier. To map planned distributions of materials onto a supply chain network, the unique relationship identifier 30 can comprise a receiving plant identifier and a material identifier. In one embodiment, wherein the graph 1 represents a process network, the unique relationship identifier 30 can comprise a serial number and/or identifiers associated with business documents, such as reference numbers for orders, invoices, returns, etc.

The technical function of the unique relationship identifier 30 is to establish both intra- and interorganizational links/connections between entities in the network. In one embodiment, wherein the graph 1 represents a production network, the plant identifier therefore is a crucial parameter of the unique relationship identifier 30 as it ensures that the SKUs are connected correctly within one plant. In one embodiment, wherein the graph 1 represents a planned distribution network, the receiving plant identifier is a crucial parameter of the unique relationship identifier 30 to ensure that the SKUs of different plants/factories are connected correctly, i.e., according to the underlying bill of distribution (BOD). In one embodiment, wherein the graph 1 represents a manufacturing process network, the serial number is a crucial parameter of the unique relationship identifier 30 as it ensures that the flow of material and/or components in a manufacturing process is correctly established between process steps of different process instances, e.g. of an overall manufacturing process. Similarly, in one embodiment, wherein the graph 1 represents a business process network, the identifier usually associated with business documents is a crucial parameter for the unique relationship identifier 30. In one embodiment, the graph 1 can represent any combination of a supply chain network, a distribution network, and a process network.

According to the invention, the directed edge 15; 25 shown in FIG. 1 emerges from recording the start node 10 and the end node 20 in the data structure along with the corresponding unique relationship identifier 30. The data structure is subsequently also references as first data structure.

In one embodiment, the data structure is a (relational) data table, wherein the start node 10 and the end node 20 are recorded in two rows of the data table. The data table is subsequently referenced as Signal Link Table. The minimal data set required to store the start node 10 and the end node 20 of FIG. 1 in the Signal Link Table is presented in Table 1.

TABLE 1

| Minimal data set for storing an edge in a data structure. | | |
| --- | --- | --- |
| Node | Signal_In | Signal_Out |
| A (start node) | — | XYZ |
| B (end node) | XYZ | — |

Each record of the data structure of Table 1 comprises at least a combination of a number of first attributes, in which an identifier of a node is stored, a combination of a number of second attribute, in which an identifier of an incoming edge is stored, and a combination of a number of third attribute, in which an identifier of an outgoing edge is stored. In Table 1, the number of first attributes is one, i.e., there is one first attribute which is labeled "Node". Similarly, the number of second attributes and the number of third attributes are one. In this minimal example, the nodes are identified by "A" and "B". In other examples, several first attributes which qualify to identify a node in a graph may need to be combined in order to uniquely reference nodes in the graph.

The second attribute in Table 1 is labeled "Signal_In". In the second attribute, the unique relationship identifier of the incoming edge 25 which is connected to the end node 20 of the same record is recorded. The incoming edge connected to a node is a directed edge of which the node is the destination. In the example of FIG. 1, end node 20 is the destination of the incoming edge 25 with the unique relationship identifier "XYZ".

The third attribute of Table 1 is labeled "Signal_Out". In the third attribute the unique relationship identifier of the outgoing edge 15 which is connected to the start node 10 of the same record is stored. The outgoing edge connected to a node is a directed edge of which the connected node is the origin. In the example of FIG. 1, the origin of the outgoing edge 15 with the unique relationship identifier "XYZ" is the start node 10.

Hence, the directed edge 15; 25 is formed by the outgoing edge 15 connected to the start node 10 and the incoming edge 25 connected to the end nod 20 as the value of the "Signal_In" attribute of the second row in the Signal Link Table matches the value of the "Signal_Out" attribute of the first row in the Signal Link Table. In this way, the graph stored in the data structure can be established and prepared/provided for analysis.

A composite unique relationship identifier 30 based on multiple second attributes and/or third attributes enables the generation of different graphs from the same data structure, wherein the graphs differ in particular in the directed edges between two nodes. I.e., insights on various relationships between two entities in the network can be gained efficiently.

In one embodiment, the directed edge 15; 25 shown in FIG. 1 can represent a relationship in a process network. Table 2 gives an example for the data structure required to store a start node 10 and an end node 20 such that a directed edge 15; 25 emerges, the directed edge 15; 25 representing a relationship in the process network.

TABLE 2

| Data set for storing an edge of a process graph in a data structure. | | | | |
|---|---|---|---|---|
| Case ID | Activity | Timestamp | Signal_In | Signal_Out |
| 1 | A | 01. Dec | — | XYZ |
| 2 | B | 02. Dec | XYZ | — |

In this example, the number of first attributes is two. The combination of first attributes is created from the "Case ID" attribute, in which process instances are stored, and from the "Activity" attribute, in which process steps related to a process instance are stored. The start node 10 is hence identified by "1A" and the end node 20 is identified by "2B".

In the example of Table 2, each node 15; 25 represents a process step of two different interconnected process instances. The second attribute and the third attribute of the data structure shown in Table 2 correspond to the second attribute and the third attribute of the data structure presented in Table 1. Table 2 further comprises a fourth attribute, in which a sequence of the process steps within a process instance is stored, represented by the attribute "Timestamp" in Table 1.

Process protocols comprising the attributes "Case ID", "Activity" and "Timestamp" are known. According to an embodiment of the invention, the process protocol is extended by the second attribute, "Signal_In", and the third attribute, "Signal_Out", which provide information about which process steps are connected to another process step such that a process graph emerges from the process protocol.

Figure 2:
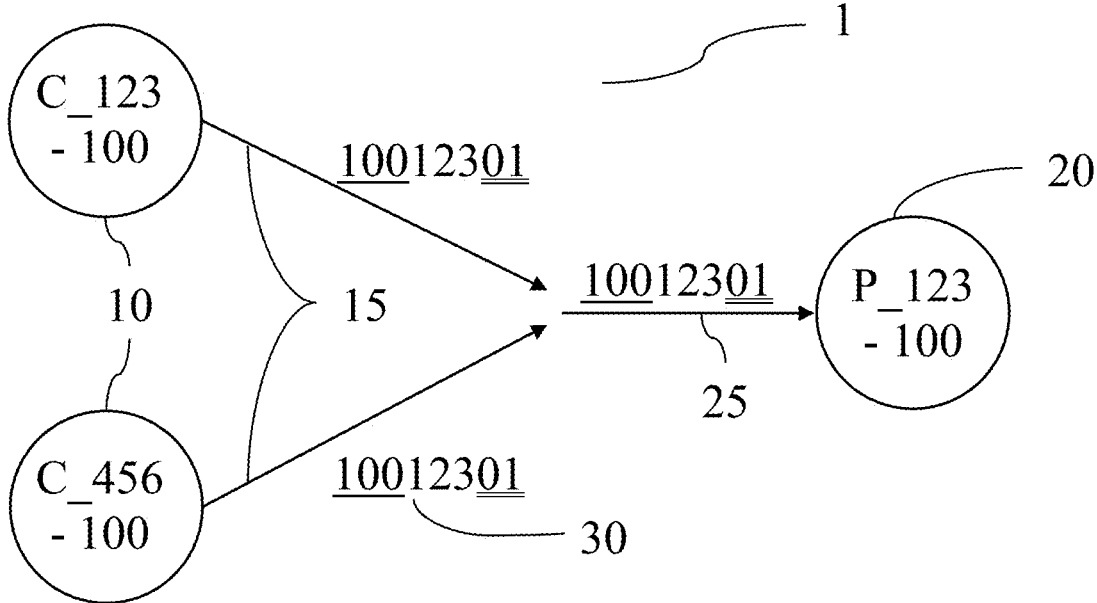
FIG. 2 shows a visualization of a graph representing a basic production network, wherein a product is produced from two components.

FIG. 2 shows a visualization of a graph representing a basic production network, wherein a product is produced from two components.

In the following, the emergence of the graph 1 shown in FIG. 2 from the data structure according to an embodiment of the invention is derived from raw data tables comprising information about SKUs, i.e., plant and material combinations of a supply chain network.

In this example, the data structure in which the graph 1 of FIG. 2 is to be stored is populated with records created from two raw data tables, Table 3 and Table 4, both presented below.

TABLE 3

| Raw table comprising information about products and/or semi-finished goods. | | | |
|---|---|---|---|
| Material ID | Plant ID | BOM ID | Alt BOM ID |
| P_123 | 100 | 123 | 01 |

TABLE 4

| Raw table comprising information about the components of a BOM from which the products and/or semi-finished goods are to be produced. | | | | |
|---|---|---|---|---|
| BOM ID | Alt BOM ID | Counter | Material ID | Plant ID |
| 123 | 01 | 1 | C_123 | 100 |
| 123 | 01 | 2 | C_456 | 100 |

Table 3 links bills of materials (BOMs) to SKUs. To achieve this, Table 3 lists products or semi-finished goods along with their BOM identifier and their alternative BOM identifier. Hence, the SKUs of Table 3 are technically represented by end nodes 20.

Table 4 contains information about individual BOMs and its components. That is, it links BOMs (and related Alt BOMs) to SKUs from which products are to be manufactured. Hence, the SKUs of Table 4 are technically represented by start nodes 10. Note that the counter attribute in Table 4 is introduced for creating a primary key.

In an embodiment of the invention, the unique relationship identifier 30 is created according to a predefined rule, for instance, a combination, in particular a concatenation, of the plant identifier, the BOM identifier and the alternative BOM identifier for each node 10; 20 of Table 3 and Table 4. The nodes of Table 3 and Table 4 are recorded in the data structure, wherein the respective node identifier is recorded in the first attribute of the data structure. For each node, the created unique relationship identifier 30 associated with the respective node is recorded in the third attribute or the second attribute, depending on whether the respective node is a start node 10 or an end node 20. The resulting Signal Link Table is presented below as Table 5.

TABLE 5

| Signal Link Table for storing the graph of FIG. 2 in a storage device. | | |
|---|---|---|
| Case Key (Material-Plant) | Signal_In | Signal_Out |
| P_123-100 | 10012301 | — |
| C_123-100 | — | 10012301 |
| C_456-100 | — | 10012301 |

The node identifier is a combination of a material identifier and a plant identifier. The resulting attribute is labeled "Case Key". In the "Case Key" attribute, the material identifier, e.g., "P_123", is combined with the plant identifier, e.g., "100".

The unique relationship identifier 30 for the incoming edge 25 and the outgoing edge 15 connected to the nodes 10; 20 of the graph of FIG. 2, comprises the plant identifier (underlined in Table 5), the BOM identifier and the alternative BOM identifier (double underlined in Table 5) of Table 3 and of Table 4, respectively.

The graph 1 visualized in FIG. 2 can be the output of a graph visualization device to which the data structure according to Table 5 is provided for displaying the graph representing the production network.

The basic example of FIG. 2 illustrates the technical advantages of the method to store a graph 1 according to the invention over traditional approaches. While the raw data tables, i.e., Table 3 and Table 4 essentially comprise data on the entities of a network, traditional approaches requires further information (e.g. structure and/or schema information) on how the entities are connected in the network in order to first create and then store a graph representing the network. In particular, connections are established traditionally by joining the relevant tables in a data base. In the example of FIG. 2 there are only two raw data tables, however, in practice there may be hundreds, if not thousands, of data tables representing the entities of a network. Using the method according to the invention to store the graph, therefore has the technical advantage, that complex join operations become unnecessary. The nodes 10; 20 of the graph 1 can be stored independently, i.e., without knowledge of their neighborhoods, in a data structure which maps exactly to the underlying graph structure. In particular, every end node 20 is recorded with the incoming edge 25 it is connected to and every start node 10 is recorded with the outgoing edge 15 it is connected to. As a result, the graph 1, when needed to be visualized and/or analyzed, may be simply read out from the data structure without the necessity of any complex operations such as joining tables in a data base.

The basic example of FIG. 2 also shows the efficiency of the storage of the graph 1 according to the invention. The graph of FIG. 2 comprises only two directed edges 15; 25. However, both directed edges comprise an incoming edge 25 to the node "P_123-100", which is therefore duplicated. The method according to the invention, however, automatically removes redundant data such as duplicated records of combinations of nodes 10; 20 and incoming edges 25 or outgoing edges 15. Thus, the three records of Table 5 correspond exactly to the three combinations of nodes 10; 20 and outgoing/incoming edges 15; 25 shown in FIG. 2.

Figure 3:
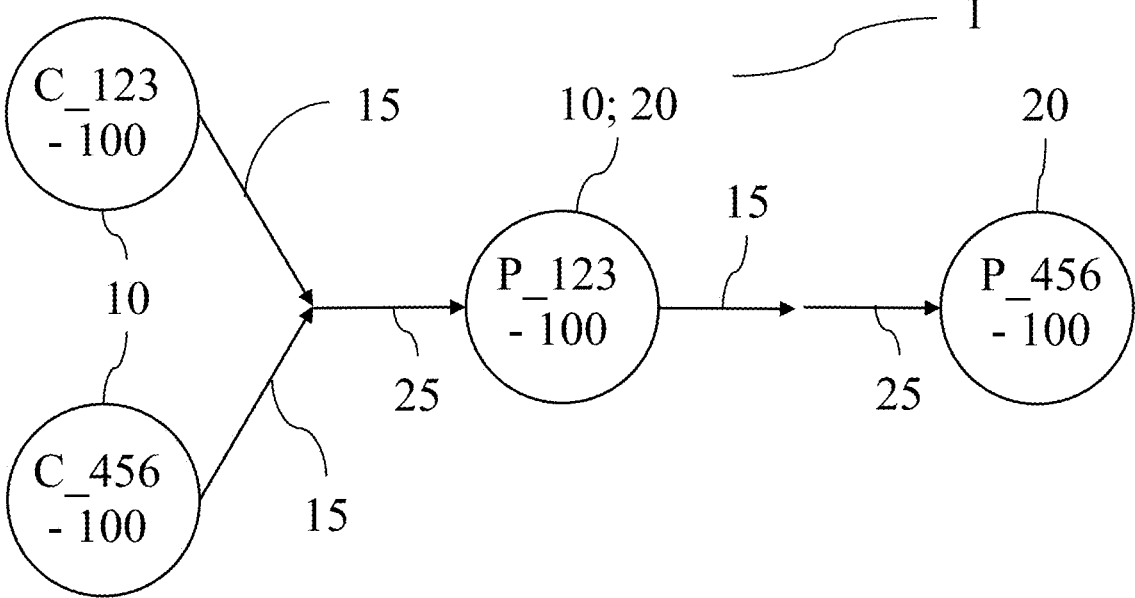
FIG. 3 shows a visualization of a graph representing a production network, wherein a product is used to produce another product.

FIG. 3 shows a visualization of a graph representing a production network, wherein a product is used to produce another product.

The graph 1 shown in FIG. 3 can be considered as an extension of the example of FIG. 2. The product "P_123", which is produced from the two components "C_123" and "C_456", is further used to produce the product "P_456". The product "P_123" therefore is connected both to one incoming edge 25 and to one outgoing edge 15.

An example for a data structure from which the graph 1 shown in FIG. 3 emerges is given in Table 6.

TABLE 6

| Signal Link Table in which the graph visualized in FIG. 3 is stored. | | |
| --- | --- | --- |
| Case Key | Signal_In | Signal_Out |
| P_456-100 | Plant ID ‖ BOM ID ‖ Alt BOM ID | — |
| P_123-100 | — | Plant ID ‖ BOM ID ‖ Alt BOM ID |
| P_123-100 | Plant ID ‖ BOM ID ‖ Alt BOM ID | — |
| C_123-100 | — | Plant ID ‖ BOM ID ‖ Alt BOM ID |
| C_456-100 | — | Plant ID ‖ BOM ID ‖ Alt BOM ID |

Table 6 comprises five records, i.e., exactly one record for every combination of a node 10; 20 with an incoming edge 25 or an outgoing edge 15. Hence, there is one record of the node "P_123-100" as end node with a first unique relationship identifier stored in the second attribute and one record of the node "P_123-100" as start node with a second unique relationship identifier stored in the third attribute. In this example, the first unique relationship identifier and the second unique relationship identifier are just sketched by the identifiers (IDs) of which they are composed.

Using the method according to the invention, BOMs defining a production network which can be represented by a graph 1 can be stored in a dedicated data structure.

The data structure is able to fully map the graph 1 onto a storage device in a computationally efficient and robust way (e.g. by avoiding complex join operations), wherein nodes can be connected to other nodes such that SKUs of the production network can be connected to other SKUs and both serve as inputs or outputs of production.

Figure 4:
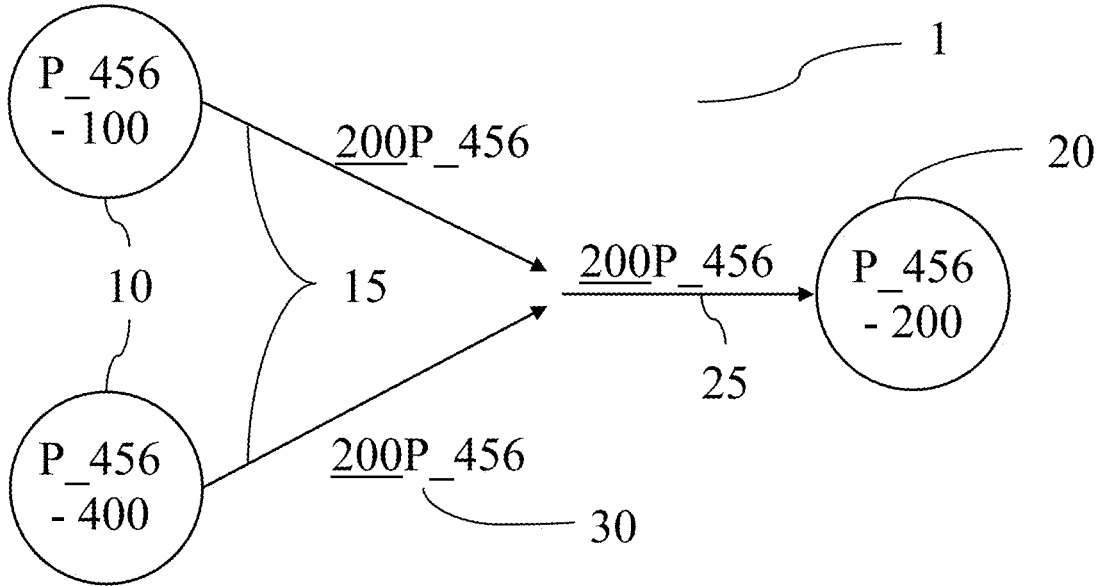
FIG. 4 shows a visualization of a graph representing a basic distribution network.

FIG. 4 shows a visualization of a graph representing a basic distribution network.

The graph 1 shown in FIG. 4 is very similar to the graph 1 shown in FIG. 2, however, the graph 1 of FIG. 4 represents a distribution network wherein the graph 1 of FIG. 2 represents a production network. In order to establish connections in a distribution network, the unique relationship identifier 30 is created from a combination, in particular a concatenation, of a receiving plant identifier and a material identifier.

The graph 1 shown in FIG. 4 is an example, wherein product "P_456" at plant "200" is to be procured externally, which means supplied from plant "100" and plant "200". The node "P_456-200" therefore is connected to the nodes "P_456-100" and "P_456-400" via two directed edges. The data structure of which the graph 1 can be reconstructed is sketched in Table 7.

TABLE 7

| Signal Link Table in which the graph visualized in FIG. 4 is stored. | | |
| --- | --- | --- |
| Case Key | Signal_In | Signal_Out |
| P_456-200 | Receiving Plant ID ‖ Material ID | — |
| P_456-100 | — | Receiving Plant ID ‖ Material ID |
| P_456-400 | — | Receiving Plant ID ‖ Material ID |

Figure 5:
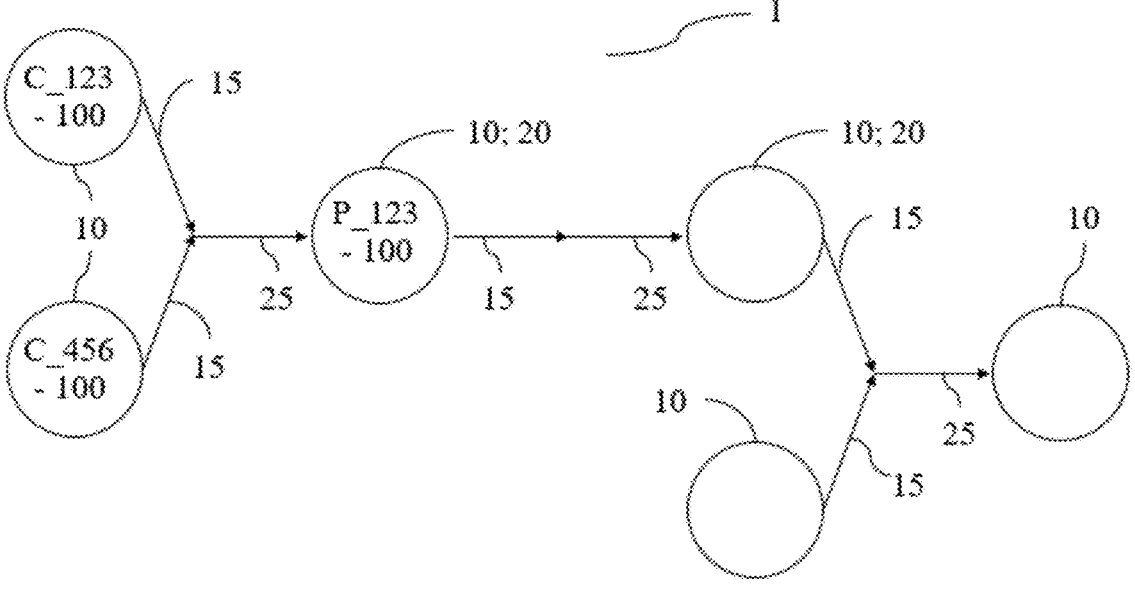
FIG. 5 shows a visualization of a graph representing an example of a combined production and distribution network.

FIG. 5 shows a visualization of a graph representing an example of a combined production and distribution network.

The graph 1 of FIG. 5 results from extending Table 6 by Table 7, or vice versa. This example demonstrates particularly that an extension/adaptation of a graph stored with a storage device according to an embodiment of the invention is computationally very efficient. In a traditional approach to store the graph, the schema for creating the graph from raw data needs to be adapted in order to compute neighborhoods for each node and the computation of neighborhoods involves joining multiple raw data tables.

According to an embodiment of the invention, the graph of FIG. 5 can be stored in Table 8, as presented below.

TABLE 8

| Signal Link Table in which the graph visualized in FIG. 5 is stored. | | |
| --- | --- | --- |
| Case Key | Signal_In | Signal_Out |
| P_456-200 | Receiving Plant ID ‖ Material ID | — |
| P_456-100 | — | Receiving Plant ID ‖ Material ID |
| P_456-400 | — | Receiving Plant ID ‖ Material ID |
| P_456-100 | Plant ID ‖ BOM ID ‖ Alt BOM ID | — |
| P_123-100 | — | Plant ID ‖ BOM ID ‖ Alt BOM ID |
| P_123-100 | Plant ID ‖ BOM ID ‖ Alt BOM ID | — |
| C_123-100 | — | Plant ID ‖ BOM ID ‖ Alt BOM ID |
| C_456-100 | — | Plant ID ‖ BOM ID ‖ Alt BOM ID |

The graph 1 emerging from Table 8 represents a combined production and interorganizational distribution network The context of the (sub-) network represented by the graph 1 stored according to an embodiment of the invention may be simply switched by switching the predefined rule to construct/create the unique relationship identifier 30 which is assigned to the incoming edge 25 and/or the outgoing edge 15. Thus, a BOM connection logic can be simply merged with a BOD connection logic.

The graph 1, such as shown in FIG. 5, provides an iterative connection of SKUs across the supply chain network, which enables organizations to identify effects in the network caused by issues that arise at any SKU of the supply chain network. For example, if a purchase order is running late in plant "100" for the component "C_123", this would have an effect on plant's "100" ability to produce the product "P_123". Subsequently, this purchase order running late therefore could disrupt the supply of product "P_123" from plant "100" to plant "200".

Depending on data sources available in the organization, this exact same approach of storing a graph 1 according to the invention can be used to include even more nodes into the graph, such as nodes representing supply data from supplier ERP systems, or customer demand from customer ERP systems.

FIG. 6 shows a flow chart for the method to store a graph representing a network according to an embodiment of the invention.

According to an embodiment of the invention the method to store a graph in a storage device follows the steps A to D with an optional step E, as outlined below.

Initializing, in step A, a data structure comprising a first attribute, a second attribute and a third attribute.

Creating, in step B, for each node of the graph a node identifier.

Creating, in step C, for each node of the graph a unique relationship identifier 30 for an incoming edge 25 and/or an outgoing edge 15 the node is connected to.

Recording, in step D, the node identifier in the first attribute and the respective unique relationship identifier 30 in the second attribute or the third attribute of the data structure.

Optionally providing, in step E, the data structure to a graph visualization device for displaying the network which is represented by the graph.

Figure 7:
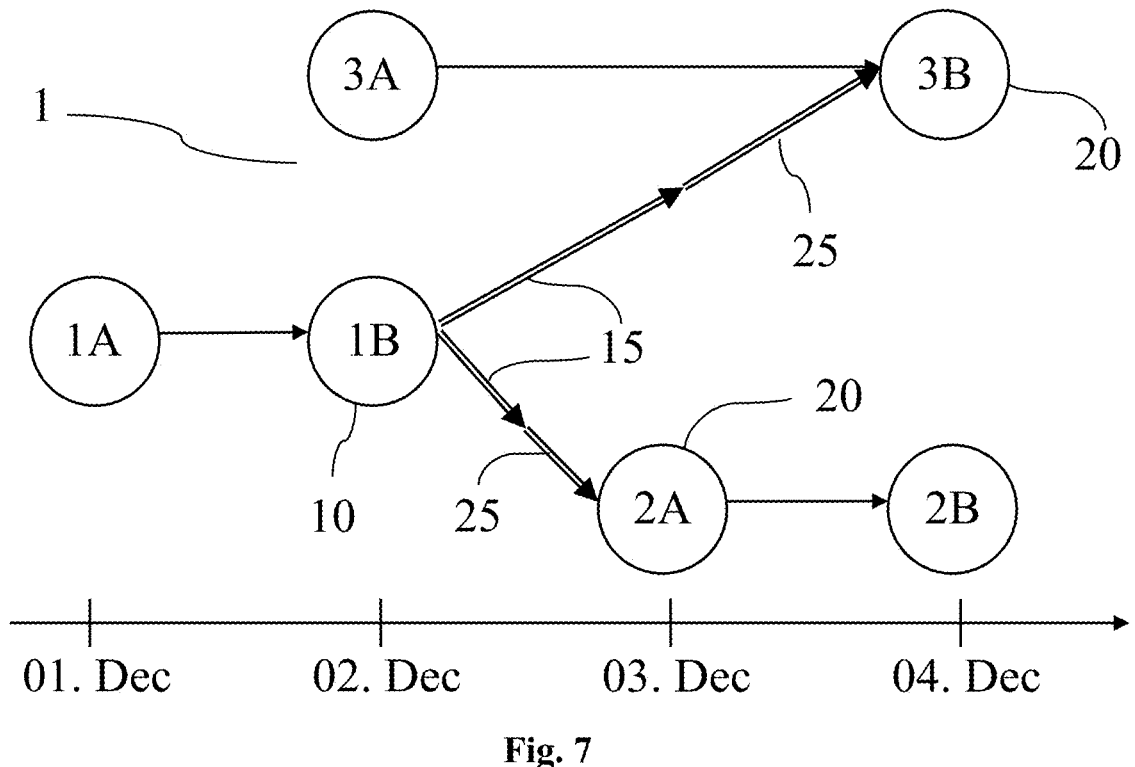
FIG. 7 shows a visualization of a graph which represents a process network.

FIG. 7 shows a visualization of a graph which represents a process network.

As described with respect to FIG. 1, in one embodiment of the invention the graph 1 emerging from the data structure can represent a process network. Whereas single process instances consist of a linear sequence of activities or process steps, process steps of different process instances can be connected by a signal to form a process network. A signal marks a direct transmission from one process instance or case to another. A signal can, for instance, represent a good which is created by one process and is consumed by another process or a phone call which spawns as a new process. In general, the signal is an output from an instance of a first process which becomes an input to an instance of a second process. In the process network, a signal is spawned by one or more activities and can be consumed by one or more activities. Technically, the signal is represented by the unique relationship identifier 30.

To account for the linear sequence of activities in a process instance, the data structure according to an embodiment of the invention is extended by a fourth attribute. In the fourth attribute, a sequence of the process steps within a process instance is stored.

An example for the data structure of which the graph 1 visualized in FIG. 7 emerges, is given below in Table 9.

TABLE 9

| Signal Link Table from which the process graph visualized in FIG. 7 can be generated. | | | | |
|---|---|---|---|---|
| Case ID | Activity | Timestamp | Signal_In | Signal_Out |
| 1 | (A) Produce Screws | 01. Dec | | |
| 1 | (B) Screws into warehouse | 02. Dec | | 10 |
| 2 | (A) Get screws from warehouse | 03. Dec | 10 | |
| 2 | (B) Produce Chair | 04. Dec | | |
| 3 | (A) Receive Sales Order | 02. Dec | | |
| 3 | (B) Deliver screws to customer | 04. Dec | 10 | |

The data structure of Table 9 resembles an extended process protocol. The classical process protocol comprising the "Case ID", "Activity" and "Timestamp" attributes is extended by the "Signal_In" and "Signal_Out" attributes for recording the outgoing edges 15 and incoming edges 25 in order to represent the interactions between process instances of different processes in the process network.

In this example three process instances or cases are shown, each resulting from the execution of a different process. In case with ID "1", "case 1", screws are produced which are in "case 2" used to further produce a chair and in "case 3" directly sold to a customer. Based on the data of Table 9 the process graph 1 visualized in FIG. 7 can be generated and calculations on the directed edges 15; 25 of the process graph 1 performed.

According to an embodiment of the invention, the signals can also connect cases across multiple extended process protocols. The signals are identified by the unique relationship identifier 30, independently of the extended process protocol.

The graph 1 shown in FIG. 7 comprises two types of links between the activities. A first type of activities is only related to the case or process instance of which it forms part. A second type of activities, connected by the direct edges 15; 25 represented with double-lined errors, are connected by a signal with the unique relationship identifier "10" between two different cases. Those records belonging to the first type of activities are stored in the Signal Link Table shown in Table 9 without any unique relationship identifiers assigned to the second attribute and the third attribute. Those records belonging to the second type of activities store either a start node 10 or an end node 20. Accordingly, the unique relationship identifier 30 is recorded in the third attribute or the second attribute of the corresponding records in the Signal Link Table. In this example, the value "10" for the unique relationship identifier 30 is given by the serial number of the screws.

The records of the Signal Link Table can comprise a number of further attributes, in which data characterizing the respective incoming edge (25) and/or outgoing edge (15) is stored. The further attributes can be accessed during subsequent extraction and/or analysis steps such that arbitrary (directed) edge KPIs can be defined and evaluated.

In FIG. 7, the ordinal value stored in the fourth attribute of the data structure shown in Table 9, the timestamp, is visualized on a horizontal axis. Therefore, activities of the same process instance or case are aligned with the horizontal axis as they are executed in a linear sequence. The interactions between process instances of different processes, which are formed by a match of the unique relationship identifier 30 assigned to the outgoing edge 15 of a start node 10 with the unique relationship identifier 30 assigned to the incoming edge 25 of the end node 20, are visualized by the double-lined arrows.

Similar to the case of FIG. 5, the graph 1 shown in FIG. 7 enables organizations to identify effects in the network caused by issues that arise at any activity in the process network. For example, if the screws are registered late in the warehouse in the activity "B" of "case 1", this would have an effect on the ability to produce the chair in "case 2" and to deliver screws to the customer in due time in "case 3".

To fully leverage the information contained in the Signal Link Table and in the graph 1 presented in FIG. 7 emerging from Table 9, the process network, in particular the interactions between activities in the process network, are to be analyzed. Hence, the signals are to be transformed into a format which can be processed by process mining operators. The format can be, for instance, a table in a relational data base.

The transformation of the Signal Link Table, as for example Table 9, into a format that enables the analysis of signals, that is, directed edges between two nodes in the process graph can be achieved with the operators "LINK_SOURCE" and "LINK_TARGET". The first operator, "LINK_SOURCE" pulls values of the combination of the number of first attributes, the combination of the number of second attributes and the fourth attribute of source activities, i.e., records comprising start nodes 10, into a second data structure. Similarly, the second operator, "LINK_TAR-GET", pulls the combination of the number of first attributes, the combination of the number of third attributes and the fourth attribute of target activities, i.e., records comprising end nodes 20, into the second data structure. In the second data structure, the resulting values from the first operator and the second operator are merged on the unique relationship identifier 30, which means they are pulled into the same record if they belong to the same signal. In case a signal is established between multiple end nodes and start nodes, the cross product of records is created in the second data structure.

Moreover, the "LINK_SOURCE" operator and the "LINK_TARGET" operator can access any attribute of the records comprising start nodes 10 and/or end nodes 20. In particular, they can access further attributes of the records in which data characterizing the respective incoming edge 25 and/or outgoing edge 15 is stored. The operators can retrieve any value stored in a further attribute and assigned it to the formed directed edge (15; 25). The retrieved values are stored in a number of further attributes of the second data structure, respectively.

For the example of Table 9, the resulting second data structure, thereafter referenced as Edge Table, is given in Table 10.

TABLE 10

Edge Table generated from the Signal Link Table shown as Table 9.

| LS(Activity) | LT(Activity) | LS(TS) | LT(TS) | LT(TS) – LS(TS) |
|---|---|---|---|---|
| Screws into Warehouse | Get screws from warehouse | 02. Dec | 03. Dec | 1 Day |
| Screws into warehouse | Deliver screws to customer | 02. Dec | 04. Dec | 2 Days |

LS abbreviates "LINK_SOURCE", LT "LINK_TARGET" and TS "Timestamp".

The Edge Table can be used for all kinds of process mining operators to gain insights on the interactions between activities of different processes in the process network, such as calculating their throughput times.

In the Edge Table, in the first attribute, the node identifier of start nodes 10 is stored. In the second attribute, the node identifier of corresponding end nodes 20 is stored. In the third attribute (not shown in Table 10) the unique relationship identifier 30 of the formed directed edge 15; 25 is stored. In further attributes of Table 10, the timestamp of the start node 10 and the timestamp of the end node 20, is stored respectively. In further attributes, process performance metrics such as the time difference between the timestamp attributed to the end node 20 and the timestamp attributed to the start node 10 can be stored.

The Edge Table can be computed accordingly for the Signal Link Table (Table 8) which stores the graph 1 shown in FIG. 5, wherein the graph 1 represents a supply chain network. In this example, the "LINK_SOURCE" operator pulls the records comprising the start nodes "P_456-100", "P_456-400", "P_123-100", "C_123-100" and "C_456-100" into the first attribute of the second data structure. The "LINK_TARGET" operator pulls the records comprising "P_456-200", "P_456-100" and "P_123-100" into the second attribute of the second data structure. The resulting values are merged on the unique relationship identifier 30 which can be stored in the third attribute of the second data structure.

Figure 8:
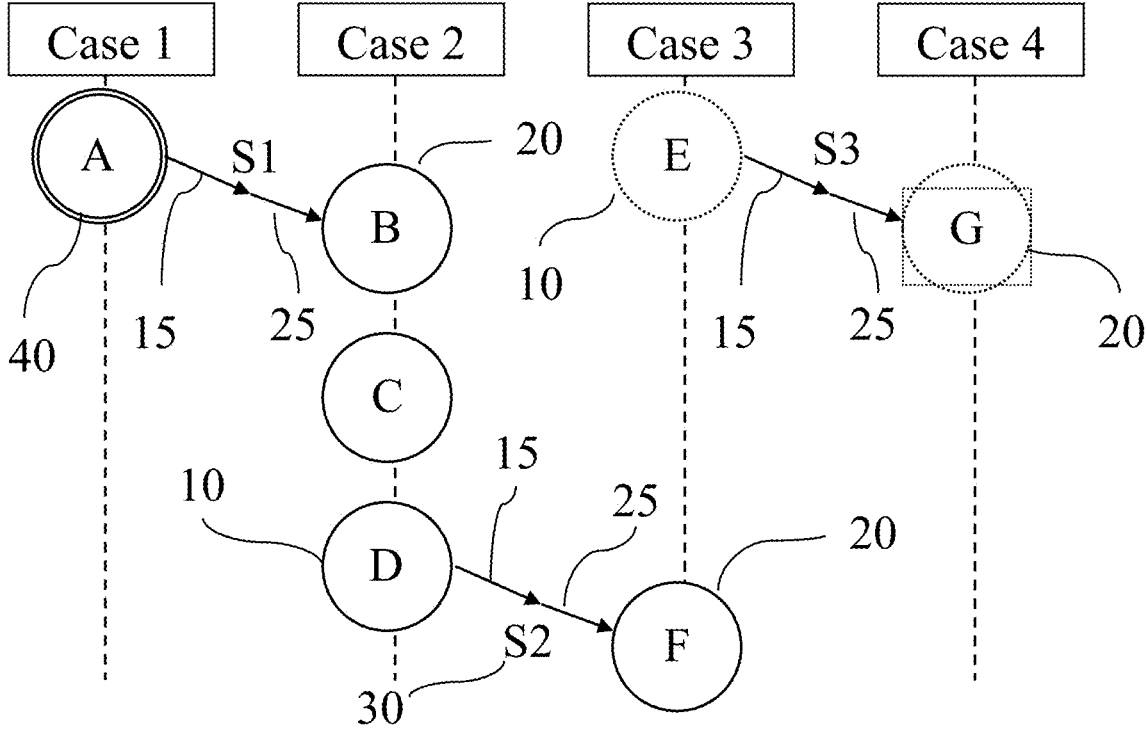
FIG. 8 shows a sequence diagram of a graph representing a process network, wherein the graph is stored according to an embodiment of the invention.

FIG. 8 shows a sequence diagram of a graph representing a process network, wherein the graph is stored according to an embodiment of the invention.

To efficiently identify problems in processes, drill-down functionality is required, i.e., the functionality to inspect specific, smaller regions of the process network. Drill-down functionality is enabled by filters which restrict a result set such as a subgraph from a process graph or a graph representing supply chain networks, according to predefined conditions. These filters eventually also restrict the number of records of the Edge Table which allows to calculate specific features (process performance measures) on their resulting signal records more efficiently.

To filter the Edge Table for subsequent process mining, traditional filter techniques are not enough since they fail to capture the underlying graph structure of the records in the Edge Table and the records of the Signal Link Table from which the Edge Table is generated.

Therefore, in one embodiment, specific filter operators, in particular the "LINK_FILTER" operator and the "LINK_FILTER_ORDERED" operator, are provided. The filter operators restrict the records of the first data structure (Signal Link Table) and/or the second data structure (Edge Table) comprising signals which are ancestors or descendants of a user defined set of nodes. The set of nodes can be a set of SKUs (supply chain networks), a set of activities (process networks) or any set of entities (general network). The direction into which the filter operator is applied can be determined via a user defined input parameter.

The filter operators can generate a subgraph from the records stored in the first data structure by traversing the graph emerging from the first data structure. Below an example is provided to demonstrate the functionality of the filter operators.

TABLE 11

Signal Link Table from which the sequence diagram
of FIG. 8 can be generated.

| Case ID | Activity | Timestamp | Signal_In | Signal_Out |
|---|---|---|---|---|
| 1 | A | 1 | — | S1 |
| 2 | B | 2 | S1 | — |
| 2 | C | 3 | — | — |
| 2 | D | 4 | — | S2 |
| 3 | E | 1 | — | S3 |
| 3 | F | 5 | S2 | — |
| 4 | G | 2 | S3 | — |

Table 11 provides a Signal Link Table comprising data of four different process instances ("Case ID"), each with a set of process steps ("Activity") executed in a given sequence ("Timestamp"). Some of the process steps/activities are interconnected by the signals S1, S2, or S3, as attributed to the second attribute ("Signal_In") and the third attribute ("Signal_Out"). Those activities with a value assigned to the second attribute, activities "B", "F" and "G", are represented by end nodes 20. Those activities with a value assigned to the third attribute, activities "A", "D" and "E", are represented by start nodes 10.

In the sequence diagram of FIG. 8 each process instance is represented by a vertical line along which the associated activities are ordered according to their timestamp. The activities represented as start nodes 10 and the corresponding activities represented as end nodes 20 are each connected via the interaction defined by a matching pair of outgoing edge 15 and incoming edge 25.

From the Signal Link Table of Table 11 the Edge Table shown in Table 12 can be calculated as outlined above. In this example, the identifier of the start/end node is given by a combination of the "Case ID" and the "Activity", e.g. "1A"/"2B" or "2D"/"3F", which are recorded in the first attribute or second attribute of the corresponding records of the second data structure, accordingly. The unique relationship identifier 30 of the formed directed edges 15; 25 are recorded in the third attribute of the second data structure, which is in the example of Table 12 the "Signal" attribute.

TABLE 12

Edge Table generated from the Signal Link Table shown as Table 11.

| LS (Case ID) | LS(Activity) | LT(Case ID) | LT (Activity) | Signal |
|---|---|---|---|---|
| 1 | A | 2 | B | S1 |
| 2 | D | 3 | F | S2 |
| 3 | E | 4 | G | S3 |

LS abbreviates "LINK_SOURCE" and LT "LINK_TARGET"

In this example the user defined initial node 40 is node "A" which is framed by a double line in FIG. 8 and marked as current member of the subgraph. For the sake of the example, the user defined direction for the filter operators is the descendant's direction, i.e., the network downstream direction. The node "A" is a start node 10 connected to an outgoing edge 15 with the unique relationship identifier "S1". The matching incoming edge 25 with the unique relationship identifier "S1" is connected to the end node "B" of case "2". Hence, the node "B" is marked as current member of the subgraph. Connected to the node "B" as being part of the same process instance, case "2", are the nodes "C" and "D", of which node "D" is connected to an outgoing edge 15 with the unique relationship identifier "S2". Hence, the nodes "C" and "D" are marked as member of the subgraph, wherein node "D" is marked as current member of the subgraph. The matching incoming edge 25 with the unique relationship identifier "S2" is connected to the node "F" of case "3". Hence, node "F" is also marked as current member of the subgraph. Connected to node "F" as being part of the same process instance is also the node "E". Without taking the "Timestamp" attribute into account, as it is done by the "LINK_FILTER" operator, node "E" is inserted into the subgraph and marked as current member since it is connected to an outgoing edge 15 with the unique relationship identifier "S3". The matching incoming edge 25 with the unique relationship identifier "S3" is connected to the node "G" of case "4". Using the "LINK_FILTER" operator, the resulting subgraph of FIG. 8 starting from node "A" in the network downstream direction comprises all nodes shown in the sequence diagram of FIG. 8. Applying the "LINK_FILTER" operator on the first data structure shown in Table 11 therefore results in selecting all the three signals "S1", "S2" and "S3" from the Edge Table shown in Table 12.

The second operator, "LINK_FILTER_ORDERED", applied to the same Signal Link Table with identical initial conditions yields a different result, as it also takes the fourth attribute of the Signal Link Table, i.e., the "Timestamp" attribute, into account. Hence, the node "E" is rejected by the "LINK_FILTER_ORDERED" operator to be inserted into the subgraph as its associated timestamp is smaller than the timestamp of the corresponding current member of the subgraph which is node "F". The subgraph resulting of the "LINK_FILTER_ORDERED" operator from the first data structure shown in Table 11 therefore comprises all the nodes shown in the sequence diagram of FIG. 8 except for node "E" and node "G". As a result, also the signal "S3" represented by the directed edge between node "E" and node "G" does not form part of the subgraph. The Edge Table 12 filtered by the subgraph resulted from the "LINK_FILTER_ORDERED" operator therefore only comprises the records of the signal "S1" and the signal "S2".

The search for the subgraph is performed according to a traversal of the graph 1 which is generated from the first data structure, by starting from the at least one selected node into the selected direction according to a predefined graph traversal protocol. The predefined graph traversal protocol can be a breadth-first search for records, a depth-first search for records or a combination thereof, such as an iterative deepening depth-first search for records.

The filter operators can be applied in a similar way to graphs representing a supply chain network. For instance, the graph shown in FIG. 5 as generated from the Signal Link Table of Table 8 can be filtered using the "LINK_FILTER" operator to find all suppliers for the product "P_456" at plant "100", represented by the node "P_456-100". In this example, the selected direction is the network upstream direction, and the selected initial node is the node "P_456-100". The resulting subgraph found by the "LINK_FILTER" comprises the nodes "P_456-100", "P_123-100", "P_123-100" and "C_456-100".

Further, the nodes 40; 10; 20 of the extracted subgraph can be aggregated based on a subordinate hierarchy level, wherein the formed directed edges 15; 25 are aggregated accordingly yielding an aggregated subgraph.

For instance, in the example considered above, the subordinate hierarchy level can be the combination of the machine/the plant with the material for which the process steps have been carried out. In order to analyze the transfer times between process steps of different process instances, the extracted subgraph can be mapped to a graph of which the nodes represent the subordinate hierarchy level, e.g., the combination of plant and material. As a result, further process performance indicators, such as the average time between process instances, become accessible.

FIG. 9 shows a flow chart for the method for filtering the first data structure from which a graph representing a network emerges.

The embodiments sketched by the flow chart of FIG. 9 is applicable to data recorded in the first data structure, wherein the data may represent any type of network, in particular entities of a supply chain network or process steps in a process network.

Selecting, in step A, at least one initial node 40 of the first data structure and a direction along which the filter is to be applied.

Finding, in step B, in the first data structure, the subgraph comprising all nodes 10; 20 connected to the at least one initial node 40 into the selected direction using a predefined graph traversal protocol.

Extracting, in step C, the subgraph resulting from step B and filtering the second data structure based on the directed edges of the extracted subgraph.

Providing, in an optional step D, the filtered second data structure comprising the interactions between different entities in the network to a process mining system to analyze network effects, such as process performance indicators in the case of a process network.

Figure 10:
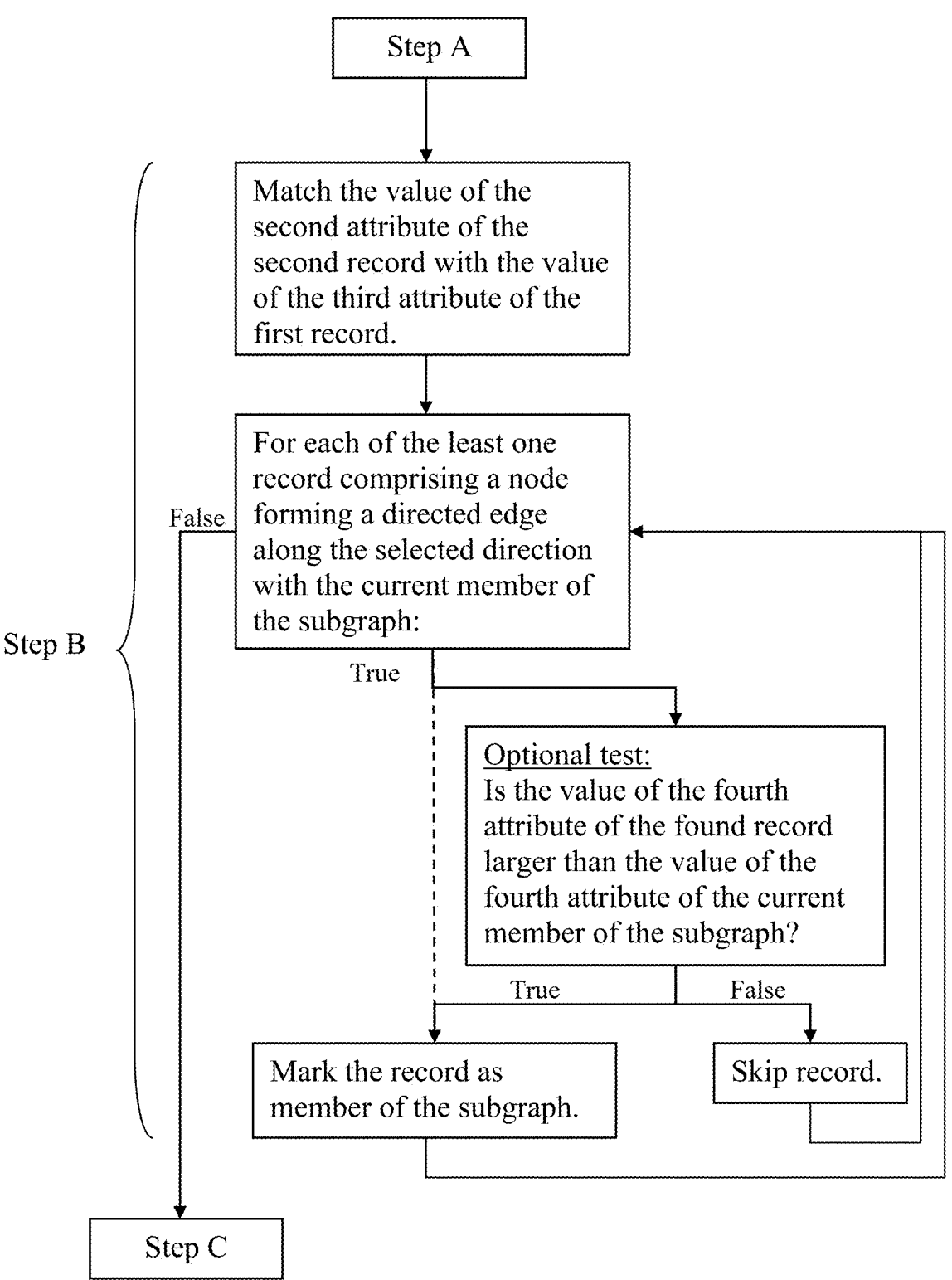
FIG. 10 shows a flow chart for step B of the embodiment of the method of FIG. 9.

FIG. 10 shows an embodiment of the drill-down functionality for the step B of the embodiment illustrated in FIG. 9.

According to the predefined graph traversal protocol, the links between two nodes are established by matching the value of the second attribute of the second record of the first data structure with the value of the third attribute of the first record of the first data structure. If a match is found, for each of the at least one record comprising a node forming a directed edge along the selected direction with the current member of the subgraph, the record can be marked directly as member of the subgraph in case of the "LINK_FILTER" operator. This option is illustrated in FIG. 10 with the dashed line.

In case of the "LINK_FILTER_ORDERED" operator, however, a test before marking the record as member of the subgraph has to be passed. It is tested, whether the ordinal value of the fourth attribute of the found record is larger than the ordinal value of the fourth attribute of the current member of the subgraph. For a positive test result, the record is marked as member of the subgraph. In the case of a negative test result, the record is skipped. In case no further record can be found, the subgraph is complete and can be extracted in subsequent step C.

In summary, the main advantage of the invention is given by a predefined procedure to record a data structure, the first data structure, by data which describes an interacting network, such as a supply chain network or a process network, wherein the interactions are recorded into the data structure without any prior knowledge on the structure of the network required. From the data structure a graph representing the network can be generated and subsequently analyzed, in particular using drill-down and/or aggregation functionality to access insights on network effects in any detail.

The invention claimed is:

1. A computer-implemented method for extracting a subgraph of a graph the subgraph starting from at least one selected node into a selected direction, wherein the graph represents a network and comprises multiple nodes and multiple directed edges, wherein each directed edge connects a start node and an end node, wherein each directed edge is composed of an incoming edge which is connected to the end node and an outgoing edge which is connected to the start node, wherein each node represents an entity of the network, wherein each directed edge represents a relationship between two entities, the method comprising:

recording, by one or more computer processors, each start node in a first record of a first data structure stored within a storage device, and each end node in a second record of the first data structure, wherein each record comprises at least:

a combination of a number of first attributes, in which an identifier of a node is stored, a combination of a number of second attributes, in which an identifier of an incoming edge is stored, a combination of a number of third attributes, in which an identifier of an outgoing edge is stored, storing, by one or more computer processors, in the first record, the identifier of the start node in the combination of the number of first attributes, and a unique relationship identifier in the combination of the number of third attributes, wherein the unique relationship identifier represents a step along a path in the network, storing, by one or more computer processors, in the second record, the identifier of the end node in the combination of the number of first attributes, and the unique relationship identifier in the combination of the number of second attributes, wherein a value of the combination of the number of second attributes of the second record matching the value of the combination of the number of third attributes of the first record defines the directed edge between the start node and the end node, wherein the subgraph is extracted, by one or more computer processors, according to a traversal of the graph starting from the at least one selected node into the selected direction according to a predefined graph traversal protocol.

2. The method of claim 1, wherein the predefined graph traversal protocol comprises one or more algorithm selected from the group consisting of:

a breadth-first search for records comprising nodes which form directed edges with the at least one selected node along the selected direction, and a depth-first search for records comprising nodes which form directed edges with the at least one selected node along the selected direction.

3. The method of claim 2, wherein the breadth-first search comprises the following steps:

a) identifying, by one or more computer processors, the at least one record of the at least one selected node based on the selected direction and marking one record of the at least one selected record as a current member of the subgraph, b) matching, by one or more computer processors, the value of the combination of the number of second attributes of the second record with the value of the combination of the number of the third attributes of the first record to find at least one record comprising the node which forms the directed edge along the selected direction with the current member of the subgraph and marking, by one or more computer processors, the at least one found record as member of the subgraph, c) repeating step b) for every record found in step b), wherein with repeating step b) each found record is marked as current record, until no further record is found and marking, by one or more computer processors, all found records as member of the subgraph, d) repeating steps b) and c) for every record of the at least one selected records, and e) extracting, by one or more computer processors, the records marked as member of the subgraph from the first data structure to store the subgraph within the storage device.

4. The method of claim 2, wherein the depth-first search comprises the following steps:

a) identifying, by one or more computer processors, the at least one record of the at least one selected node based on the selected direction and marking, by one or more computer processors, one record of the at least one selected record as a current member of the subgraph, b) matching, by one or more computer processors, the value of the combination of the number of the second attributes of the second record with the value of the combination of the number of the third attributes of the first record to find at least one record comprising the node which forms the directed edge along the selected direction with the current member of the subgraph and marking, by one or more computer processors, the at least one found record as member of the subgraph, c) repeating step b) for one record found in step b), wherein with repeating step b) the one found record is marked, by one or more computer processors, as a current record, until no further record is found, and marking all found records as members of the subgraph, d) repeating steps b) and c) for every record found in step b), e) repeating steps b), c) and d) for every record of the at least one selected records, and f) extracting, by one or more computer processors, the records marked as members of the subgraph from the first data structure to store the subgraph within the storage device.

5. The method of claim 1, wherein the selected direction is one of a network upstream direction and a network downstream direction, wherein the at least one record of the at least one selected node, in which the unique relationship identifier is assigned to the combination of the number of second attributes, is identified, by one or more computer processors, for the network upstream direction, and the at least one record of the at least one selected node, in which the unique relationship identifier is assigned to the combination of the number of third attributes, is identified, by one or more computer processors, for the network downstream direction.

6. The method of claim 1, wherein the network is a process network, wherein the process network comprises two or more process instances of different processes and interactions between process steps of process instances of at least two different processes, wherein each node represents a process step of a process instance and the unique relationship identifier represents a signal between the start node which forms part of a process instance of a first process and the end node which forms part of a process instance of a second process, in particular an output of the start node provided to the end node, and wherein the first data structure further comprises a fourth attribute, in which a sequence of the process steps within a process instance is stored, such that the data structure forms an extended process protocol.

7. The method of claim 6, wherein the fourth attribute stores an ordinal value, and wherein a record of the at least one found record is only marked as member of the subgraph if the ordinal value assigned to the fourth attribute of the record is larger than the ordinal value of the current member of the subgraph.

8. The method of claim 7, wherein the ordinal value is a timestamp related to the respective process step.

9. The method of claim 1, wherein at least one node is both the end node connected to at least one incoming edge and the start node connected to at least one outgoing edge, and wherein the method further comprises recording, by one or more processors, each node of the at least one node—in at least one record, wherein, in each record of the at least one record, the identifier of each node is assigned to the combination of the number of first attributes, a first unique relationship identifier of one incoming edge is assigned to the combination of the number of second attributes, and a second unique relationship identifier of one outgoing edge is assigned to the combination of the number of third attributes.

10. The method of claim 1, wherein the formed directed edge is recorded in a record of a second data structure stored in the storage device, the second data structure comprising at least a first attribute, in which an identifier of the start node connected to the formed directed edge is stored, a second attribute, in which an identifier of the end node-connected to the formed directed edge is stored, and a third attribute, in which the unique relationship identifier of the formed directed edge is stored.

11. The method of claim 1, wherein each record of the first data structure comprises a number of further attributes, in which data characterizing the respective incoming edge and/or outgoing edge is stored, and wherein at least one value of the number of further attributes is retrieved and assigned to the formed directed edge, wherein the at least one retrieved value is stored in a number of further attributes of the second data structure.

12. The method of claim 10, further comprising a filtering of the records of the second data structure by the at least one directed edge formed between adjacent members of the subgraph.

13. The method of claim 12, wherein the nodes of the extracted subgraph are aggregated, by one or more computer processors, based on a subordinate hierarchy level, wherein the formed directed edges are aggregated accordingly yielding an aggregated subgraph, wherein the records of the second data structure are filtered, by one or more computer processors, based on the aggregated subgraph.

14. The method of claim 13, wherein the filtered records of the second data structure are provided to a process mining system for calculating at least one process performance measure.

15. The method of claim 1, wherein the storage device is a volatile memory, in particular the main memory, of a computer system.

16. The method of claim 11, further comprising a filtering of the records of the second data structure by the at least one directed edge formed between adjacent members of the subgraph.

* * * * *